Patented Oct. 21, 1924.

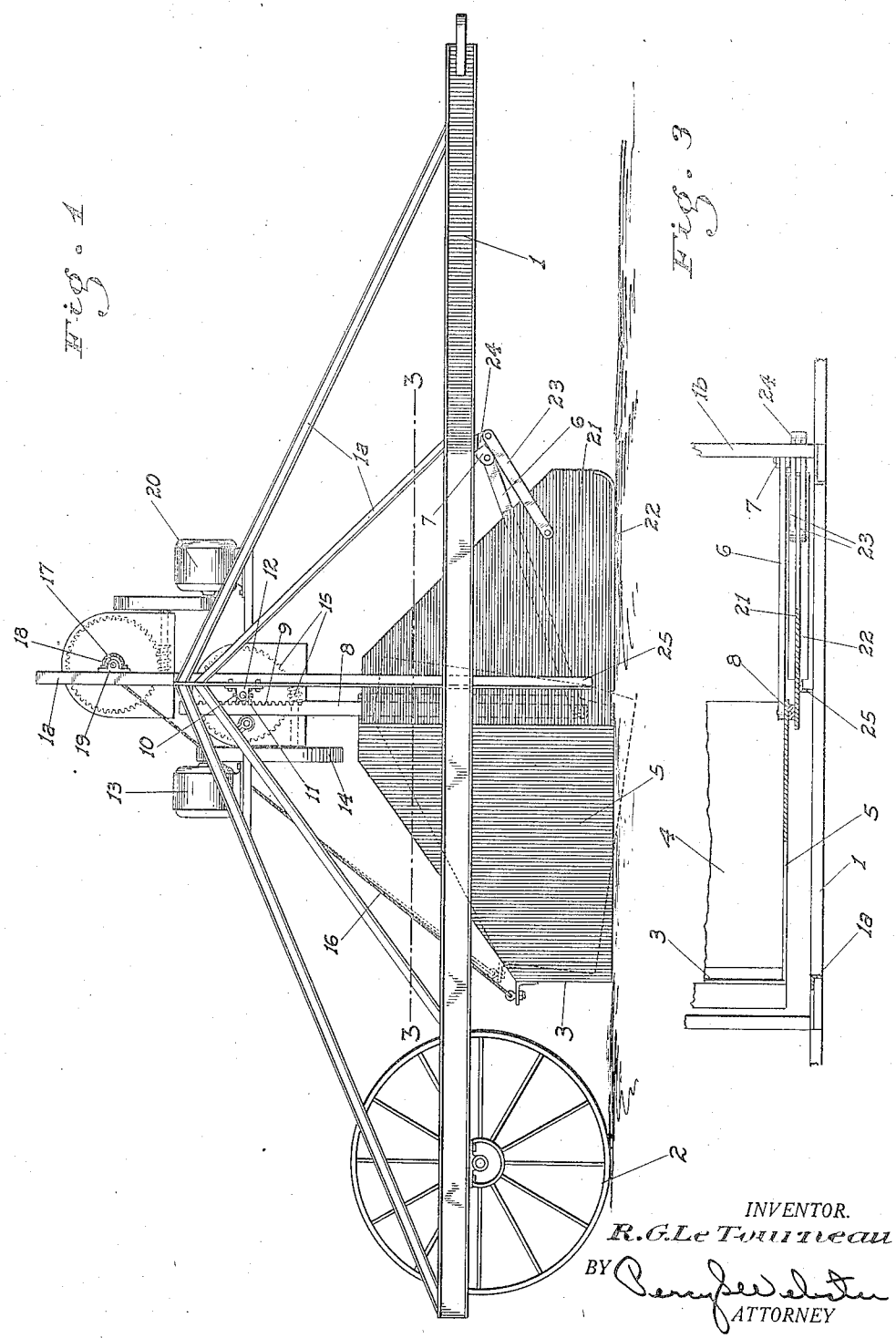

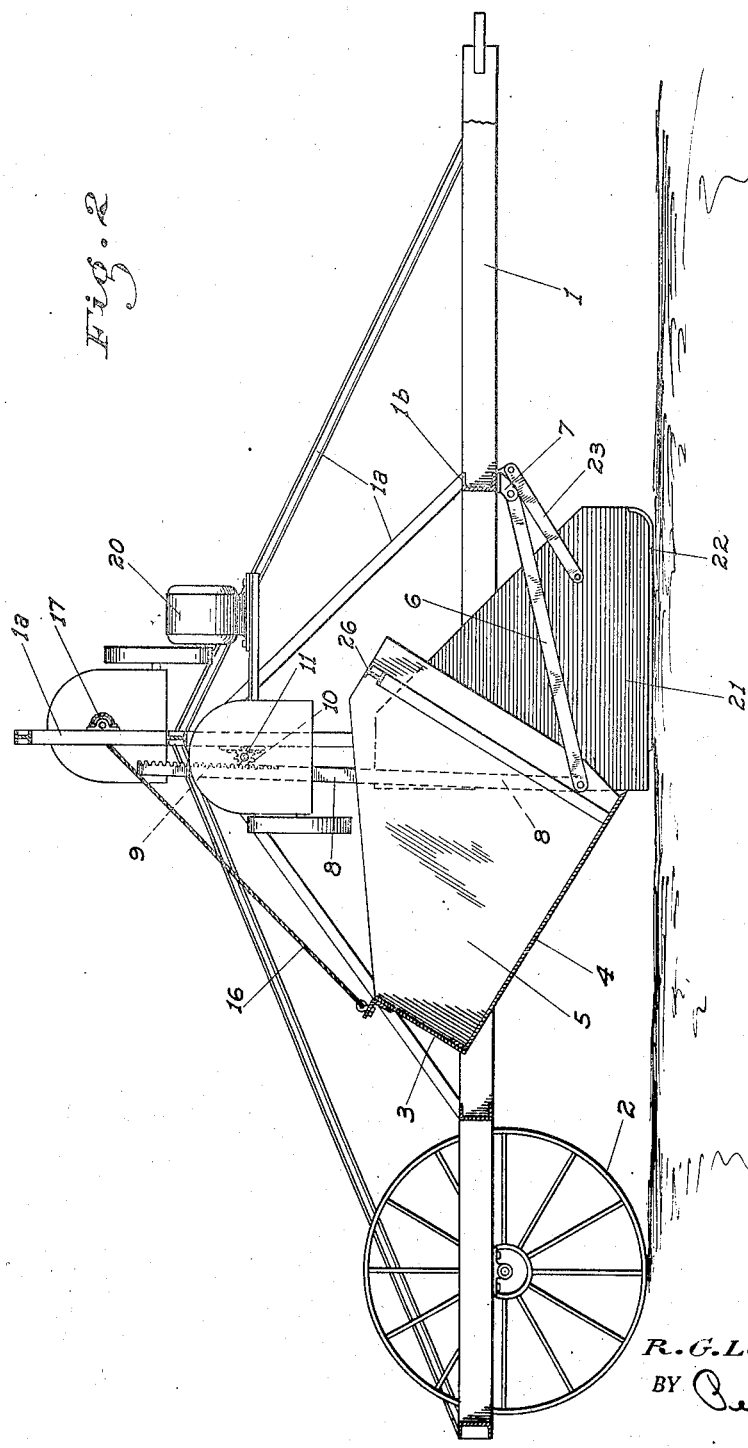

1,512,614

UNITED STATES PATENT OFFICE.

ROBERT G. LE TOURNEAU, OF STOCKTON, CALIFORNIA.

SCRAPER AND SPREADER.

Application filed July 13, 1922. Serial No. 574,654.

*To all whom it may concern:*

Be it known that I, ROBERT G. LE TOURNEAU, a citizen of the United States, residing at Stockton, county of San Joaquin, State of California, have invented certain new and useful Improvements in Scrapers and Spreaders; and I do declare the following to be a full, clear, and exact description of the same, reference being had to the accompanying drawings, and to the characters of reference marked thereon, which form a part of this application.

This invention relates to improvements in land scraping and dirt spreading devices, the principal object being to provide a machine of this character, adapted to be drawn by a tractor, by means of which a very large load of dirt may be easily scraped up and collected, which load may then be transported any necessary distance without any loss of material, and then dumped so as to be spread to any desired and positively maintained depth, or discharged in a single and compact mass at any point desired.

A further object is to so support or hang the load carrying member that after the load has been accummulated thereon said member may be raised from the ground for transportation of the load, so that the weight is carried directly by the wheels which support the machine, thereby eliminating a great amount of the drag and frictional resistance unavoidable when the scraper-scoop rests on and is dragged along the ground when loaded, as is usual, and thus enabling me to scrape and haul a far greater load, with the same power, than can be done with machines of the same size but which operate as above stated.

A further object is to provide a novel form of means for manipulating the scoop, to load or dump the same, which means are controlled by the operator of the tractor with but little physical effort on his part being necessary.

A fourth object is to provide power operated means, for raising or lowering the front or blade end of the scoop, and for independently raising or lowering the rear end of the scoop, so that an almost endless number of different settings of the scoop may be obtained, the scoop being mounted and connected to the power means in such a way that when the blade end is moved, very little if any movement is had at the rear end, and vice versa.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

On the drawings similar characters of reference indicate corresponding parts in the several views:

Fig. 1 is a side view of the machine showing the scoop adjacent the ground.

Fig. 2 is a longitudinal section of the device, showing the scoop moved to a dumping portion.

Fig. 3 is a fragmentary sectional plan taken on the line 3—3 of Fig. 1.

Referring now more particularly to the characters of reference on the drawings, the numeral 1 denotes the main horizontal and transversely spaced frame-beams of the machine, supported at the rear end by wheels 2 and adapted to be connected to and supported by a tractor at its front end. From these beams an additional framework, indicated generally at 1ª, extends upwardly, arranged to not only prevent possible buckling of the main beams, but to support certain mechanisms, as will be hereinafter seen.

Located between the beams 1 intermediate the ends thereof is the bowl or scoop 3 of the scraper, having a bottom member 4 and sides 5 of suitable dimensions. This scoop is prevented from longitudinal movement by means of radius-rods 6 pivoted to the sides 5 adjacent the front ends thereof, and extending thence upwardly to pivotal connections with lugs 7 fixed onto the cross bars 1ᵇ of the frames 1. By reason of these bars 6 extending downwardly from the frame toward the scoop, the tendency, with the forward movement of the frame, is for the front end of the scoop to be raised.

Pivoted to the scoop in common with the bars 6 are vertical bars 8 having on their upper ends a certain extent of rack teeth 9 engaged by pinions 10 mounted in common on a shaft 11 journaled in bearings 12 fixed on the framework 1ª.

This shaft is driven by an electric motor 13 mounted on said framework, through the medium of belting 14 and worm reduction gearing 15.

To the rear end of the scoop, preferably centrally of the width thereof, a flexible cable 16, or similar member is pivoted, said cable extending thence upwardly to and over a drum 17 mounted on a shaft 18 journaled in bearings 19 fixed on the framework 1ª. This shaft is driven by an electric motor 20, driving connections between the motor and shaft being arranged to suitably reduce the speed of the shaft from that of the motor, the same as employed between the motor 13 and shaft 11.

The control means for said motors are mounted on the tractor which draws the scraper, the control for each motor being independent of the other, and connected to the respective motors by conducting-wires extending along the frame of the scraper. These features are not shown, since of themselves they do not form part of my invention being merely an arrangement of parts well within the power of any ordinary electrician to install.

Overlapping the forward ends of the scoop-sides 5 somewhat on the outside thereof and extending forwardly thereof are vertical plates 21 mounted on shoes 22 adapted to rest on the ground.

These plates are independent of the scoop and are connected to the frame of the machine by means of bars 23 pivoted to said plates on each side and adjacent the forward ends thereof, which then extend upwardly to pivotal connections with lugs 24 mounted on the beams 1ª adjacent to but somewhat ahead of the lugs 7. These bars not only hold the plates against longitudinal movement, but prevent them from lateral swinging at their front ends.

Prevention of similar movement at their rear ends is had by means of vertical guide bars 25 extending down from the frames 1 outside the plates, the rack-bars 8 serving as the guides for said plates on the inner faces thereof, as shown in Fig. 3. The function of these plates, which maintain contact with the ground at all times, is to prevent the material being scraped from spilling out from the sides of the scoop in front of the same.

The sides of the scoop are prevented from spreading by means of a rigid inverted U-shaped reinforcing frame 26 fixed thereto.

In operation, to load the scoop, the scoop is set at a suitable angle as indicated in dotted lines in Fig. 1, by operating the motor 13 so as to force the forward end of the scoop down, and by also operating the motor 20 to raise up on the rear end of the scoop, if necessary. During the loading operations, the scoop cannot change its position, without intentional operation of the motors, due to the worm gearing used in connection with the drive mechanisms between the motors and the respective driven shafts. At the same time the tendency of the front end of the bowl is to rise, owing to the angle of setting of the bars 6, which normally have a downward slant, and therefore tend to assume a horizontal position. Therefore when the loading is completed, and it is desired to transport the load, the strain thrown on the motor 13 by the dead weight of the load is counterbalanced to a great extent by the upward pressure normally exerted on the scoop with the forward movement of the machine, making it an easy task for the motor to function. Both ends of the scoop are preferably raised when transporting the load, and before the point has been reached at which the load is to be dumped or spread, the operator may set the front edge of the scoop at the desired height from the ground, this height depending on the depth which it is desired to have the spread dirt occupy, so that when this point has been reached, the operator need only cause the motor 20 to function to raise the rear end of the scoop and tip it forwardly, allowing the load to slide out of the scoop, the front end of which remains in substantially the same vertical plane at which it was previously set.

If it is desired to dump the load in a single mass rather than spread it, the front end of the scoop is merely raised higher previous to tilting the rear end forward. The spread of dumping depends upon the angle or tile which the bottom of the scoop is caused to assume, which may be regulated to suit irrespective and independent of the vertical setting of the front end of the scoop.

It will of course be noted that the main strain of loading of the scoop is taken by the bars 6, the vertical bars 8 being only called upon to resist the tendency to upward movement of the scoop, as previously explained.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A scraper comprising a frame supported from the ground, a scoop hung therein, side plates on the scoop, plates independent of the scoop and frame extending forwardly from the side plates and overlapping the outer and forward edges of the same, connecting bars pivoted on the independent plates and frame ahead of the same, and vertical guide bars between the frame and independent plates adjacent the forward edge of the scoop plates, whereby the independent plates are guided in their relative vertical movement between said bars and the scoop plates.

2. A scraper comprising a frame supported from the ground, a scoop hung therein, means applied to the rear end of the scoop for raising and lowering said end, radius bars pivoted on the frame ahead of the scoop and extending thence downwardly to pivotal connections with the scoop adjacent its lower and forward end, vertical bars projecting upwardly from the scoop and pivoted thereon in common with the radius bars, and means acting on said vertical bars for controlling the movement thereof in either direction.

In testimony whereof I affix my signature.

ROBERT G. LE TOURNEAU.